Sept. 27, 1938.  A. L. STOWELL  2,131,694
COILABLE MEASURING RULE
Filed Feb. 15, 1935  2 Sheets-Sheet 1
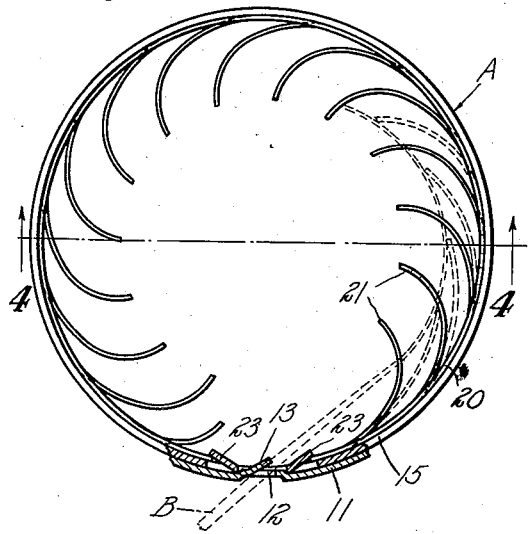
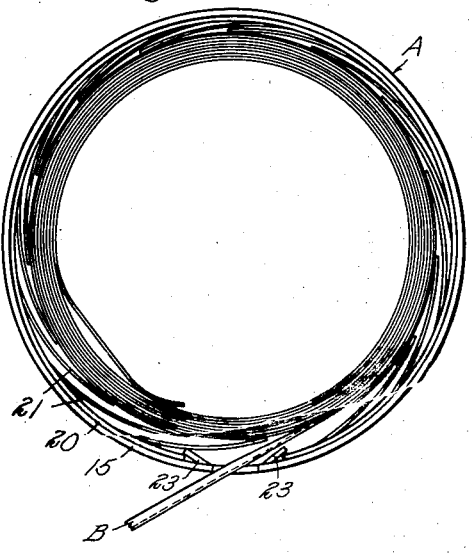
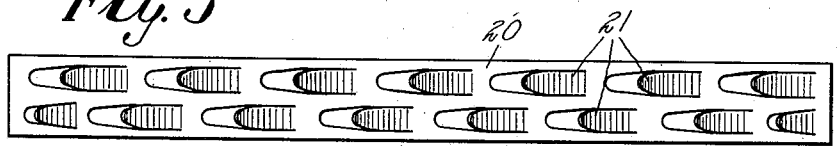
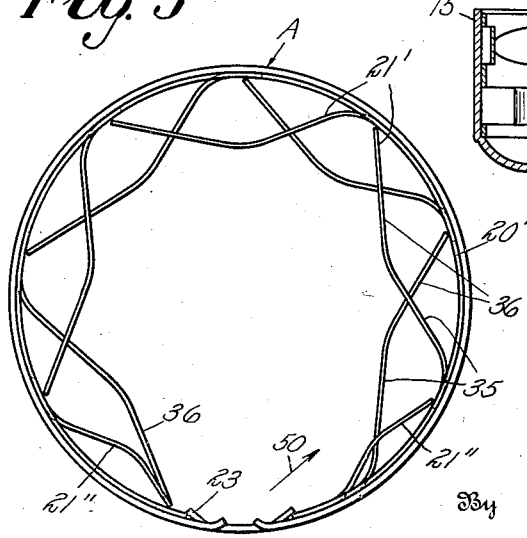
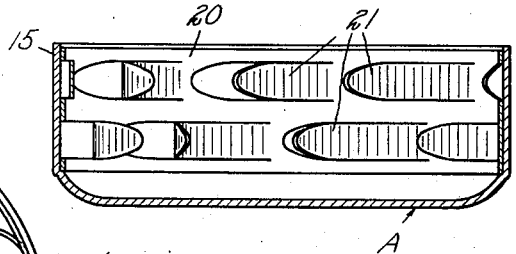
Inventor
Austin L. Stowell
By W. Clay Lindsey
Attorney Sept. 27, 1938. A. L. STOWELL 2,131,694
COILABLE MEASURING RULE
Filed Feb. 15, 1935   2 Sheets-Sheet 2

Inventor
Austin L. Stowell
By  W. Clay Lindsey
Attorney

Patented Sept. 27, 1938

2,131,694

UNITED STATES PATENT OFFICE 2,131,694

COILABLE MEASURING RULE

Austin L. Stowell, New Britain, Conn., assignor to The Stanley Works, New Britain, Conn., a corporation of Connecticut Application February 15, 1935, Serial No. 6,613

6 Claims. (Cl. 33—138)

This invention relates to coilable rules of the type having a casing and a measuring tape adapted to be wound therein into an externally wound coil, the tape being in the form of a strip of metal having a bent transverse form (for example, a concavo-convex cross section) so that it will resist bending and will, when extended, automatically assume a rectilinear state or straight rodlike form.

The invention, more particularly, relates to a measuring rule of the pull-push type wherein there is provided within the casing spring retaining means having a multiplicity of flexible spring fingers which cause the tape to assume a coiled form as the tape is pushed into the casing, the fingers being arranged to engage the external surface of the outside convolution of the coil at circumferentially spaced points with sufficient pressure to maintain the size of the coil without interfering with the smooth and easy action present in the winding and unwinding operations. The use or provision of spring or manual winding means or manipulative devices for controlling or affecting the winding operations is avoided.

The aim of the present invention is to provide in a rule of this character improved spring retaining means, the fingers of which are constructed and arranged in a novel and advantageous manner.

A further aim of the invention is to provide in a rule of the character described improved spring retaining means of extremely simple nature and which may be manufactured at a relatively low cost.

A further aim of the invention is to provide a rule of the character described with spring fingers so arranged that the tape may be wound up within the casing in either direction.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein are shown, for illustrative purposes, two of the embodiments which the present invention may take:

Fig. 1 is a side view of my improved rule, the spring fingers being shown by full lines in the positions which they have when the tape is entirely withdrawn from the casing and certain of the fingers being shown by dotted lines in the positions which they assume as the inner end of the tape is initially pushed into the casing;

Fig. 2 is a view similar to Fig. 1 but showing the tape partially wound up within the casing;

Fig. 3 is a plan view of the spring retaining means before it is inserted into the casing;

Fig. 4 is a sectional view taken on line 4—4 of Fig. 1;

Fig. 5 is a view similar to Fig. 1 but showing another embodiment;

Figure 8:
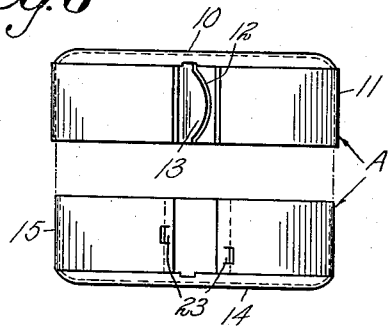
Fig. 8 is a side elevation of the two parts of the casing, the same being shown separated from one another.

Referring to the drawings in detail, A denotes generally a casing which may be of any suitable construction, those shown in the drawings being by way of illustration only. The casing, if desired, may have the shape and construction shown most clearly in Fig. 8. In this instance, the casing is composed of two cup-shaped members drawn from sheet metal and one telescoping within the other. The outer member has an end wall 10 and a peripheral or cylindrical wall 11. The wall 11 is provided with a transversely curved entrance slot 12 formed in part by a lip 13 which is directed inwardly of the casing at an angle so as to properly guide the tape into the casing as it is pushed therethrough. The other member has an end wall 14 and a cylindrical wall 15. The cylindrical wall 15 has a slot registering with the slot or opening 12 and accommodating the lip 13.

The tape, designated generally by the character B, is of the type described in the patents to H. A. Farrand No. 1,402,589 granted January 3, 1922, and No. 1,730,199 granted October 1, 1929. This tape is in the form of a metallic ribbon having a concavo-convex cross section and sufficiently flexible to be rolled or coiled; its stiffness and resiliency permitting it to assume a rectilinear state when unrestricted. When a rule of this type is freely bent longitudinally, its cross sectional form at its bent portion is changed from an arcuate to a flat, and the bent portion assumes a longitudinal curvature the radius of which generally corresponds to the radius of the arc of the cross sectional form of the rule in its extended state. In order to facilitate initial entry of the rule into the casing, the end of the rule which goes into the casing first and which ordinarily bears the highest scale mark, is rendered more easily bendable or flexible, as described in the F. A. Folz Patent No. 1,983,503 granted December 4, 1934.

In the embodiment shown in Figs. 1 to 4, the spring retaining means for causing the measuring tape to take a coiled form and for maintaining the coil comprises a strip 20 of quite thin, readily flexible metal from which is struck a plurality of staggeredly arranged fingers 21. In the present instance, these fingers are disposed in two rows or series, the fingers of one row being staggered with relation to those of the other row. The fingers are relatively narrow in width and, by preferance, their free ends are somewhat narrowed and rounded, as illustrated, so that the area of engagement between each finger and the outermost convolution of the coiled tape is relatively small. The fingers all extend in the same direction and are preferably curved longitudinally. When the retaining means is positioned within the casing, as shown in Fig. 1, the fingers are inclined inwardly of the casing in the direction in which the tape is wound up into a coil as it is pushed into the casing. The body portion of the strip 20, when inserted within the casing, expands against and takes the curved form of the peripheral wall of the casing. The spring retainer may be held against creeping or crawling with respect to the casing by a pair of lugs 23 struck from the cylindrical wall 15 at opposite sides of the slot therein.

With the arrangement described, when the inner end of the tape is initially pushed into the casing, it will successively engage the opposed or concave surfaces of the fingers, and will ride along those surfaces towards the outer end of the fingers so that the tape is caused to take a longitudinal curvature somewhat comparable to, but preferably somewhat larger than, the natural longitudinal curvature of the tape when it is freely bent transversely. Upon continued movement of the tape into the casing, the tape is caused to take an externally coiled form, and the fingers, being quite flexible, will readily move towards the peripheral wall of the casing in order to permit the coil to be built up without exerting any undue drag or binding action of the coil, while at the same time the fingers, acting collectively, will prevent the coil from unwinding; that is, the pressure of the fingers is always sufficient to substantially maintain the inner diameter of the coil substantially constant. When it is desired to take measurements, the tape may be withdrawn from the casing by merely pulling on the outer end of the tape, it being apparent that when this is done the external diameter of the coiled portion of the tape is gradually reduced and the fingers will spring inwardly of the casing so as to maintain their engagement with the external surface of the coil.

It is observed that with my improved arrangement the spring retainer for the tape may be very simply and economically manufactured, the same consisting merely of a strip of quite thin metal from which fingers may be struck. If desired, the retainer may be formed by merely feeding a strip through a punch press and then cutting the strip into the desired lengths.

Figure 6:
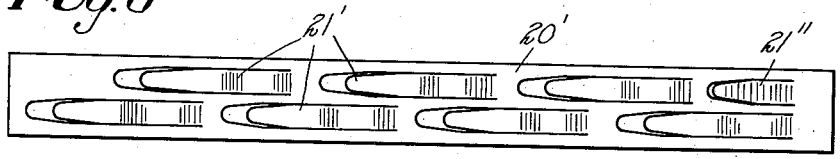
Fig. 6 is a view showing the spring retaining means of Fig. 5 before it is inserted into the casing.
Figure 7:
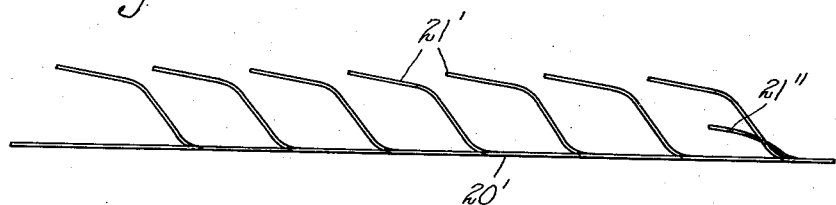
Fig. 7 is an edge view of the spring retaining means shown in Fig. 6.

Referring now to the embodiment shown in Figs. 5 to 7, the arrangement is generally similar to the preceding embodiment, but, in this instance, the fingers 21' are so constructed and arranged that the tape may be wound up into the casing in either direction. The fingers 21' are of somewhat increased length and they are bent intermediate their ends so that they have an angular form in a longitudinal direction. The strip 20', from which the fingers 21' are struck, may be held within the casing as in the preceding embodiment. When the strip is placed within the casing, each finger presents a first portion 35 inclined inwardly of the casing in one direction, and a second portion 36 inclined inwardly of the casing in the opposite direction. The inclined portion 35 of one finger crosses the inclined portion 36 of the next succeeding finger. The apexes of the fingers are circumferentially positioned and, of course, engage the outer surface of the outermost convolution of the coiled portion of the tape. With this arrangement, when the tape is wound in a clockwise direction, that is, in the direction of the arrow 50, referring to Fig. 5, the inclined portions 35 of the fingers serve as a guide for the inner end of the tape, and when the tape is wound up in the other direction, the inclined portions 36 of the fingers serve to guide the inner end of the tape. If desired, a supplemental finger 21'' may be provided to each side of the entrance slot.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a rule of the character described, a resilient measuring tape having a transverse curvature and an inherent tendency to assume a rectilinear state, a casing having an entrance slot through which said tape is moved, and spring retaining means within said casing for causing the measuring tape to take a coiled form as it is pushed into the casing and for maintaining the coil and comprising a one piece metal insert having a plurality of series of integral flexible spring fingers with the fingers of one series staggered with relation to those of the other series, said fingers substantially surrounding and engaging the external surface of the outside convolution of the coil at circumferentially spaced points and having generally radially movable portions inclined inwardly of the casing in the direction in which the tape is wound into a coil.

2. In a rule of the character described, a resilient measuring tape having a transverse curvature and an inherent tendency to assume a rectilinear state, a casing having a cylindrical wall provided with an entrance slot through which said tape is moved, and spring retaining means within said casing for causing the measuring tape to take a coiled form as it is pushed into the casing and for maintaining the coil and comprising a one piece metal insert having a plurality of rows of thin flexible integral spring fingers circumferentially positioned about the interior surface of said wall and inclined inwardly of the casing in the direction in which the tape is wound up as it is pushed into the casing, the inner ends of said fingers engaging the outermost convolution of the coiled tape at spaced points and over small areas, the fingers of one series being staggered with relation to those of the other series, and means positioning said insert within said casing.

3. In a rule of the character described, a resilient measuring tape having a transverse curvature and an inherent tendency to assume a rectilinear state, a casing having a peripheral wall provided with an entrance slot through which said tape is moved; and spring retaining means within said casing and substantially surrounding the coiled portion of the tape for causing the measuring tape to take a coiled form as it is pushed into the casing and for maintaining the coil and comprising a one piece flexible thin metal insert within the casing, and a multiplicity of spring fingers formed integrally with and struck from said insert and inclined inwardly of the casing and generally in the direction in which the tape is wound as it is pushed into the casing, said fingers being circumferentially spaced apart and having their inner ends engaging the outer surface of the outermost convolution of the coiled tape.

4. In a rule of the character described, a resilient measuring tape having a transverse curvature and an inherent tendency to assume a rectilinear state, a casing having an entrance slot through which said tape is moved, and spring retaining means within said casing for causing the measuring tape to take a coiled form as it is pushed into the casing and for maintaining the coil, and comprising a thin metal insert having a multiplicity of flexible spring fingers circumferentially arranged within the casing about the coiled portion of the tape, each finger being inclined first inwardly towards the center of the casing and outwardly towards the periphery, the inwardly inclined portion of one finger being angularly disposed to the outwardly inclined portion of an adjacent finger whereby to permit the tape to be wound up in either direction within the casing.

5. In a rule of the character described, a resilient measuring tape having a transverse curvature and an inherent tendency to assume a rectilinear state, a casing having an entrance slot through which said tape is moved, and spring means within the casing about the coiled portion of the tape and comprising a plurality of circumferentially spaced flexible spring fingers, each finger being first inclined inwardly towards the center of the casing, then outwardly towards the periphery of the casing, the inwardly inclined portion of each finger being in crossed relation to the outwardly inclined portion of the next succeeding finger.

6. In a rule of the character described, a resilient measuring tape having a transverse curvature and an inherent tendency to assume a rectilinear state, a casing having a peripheral wall provided with an entrance slot through which said tape is moved, and spring retaining means for causing the measuring tape to take a coiled form as it is pushed into the casing, said retaining means comprising a one piece thin metal insert having a plurality of circumferentially spaced apart integral spring fingers, and means positioning said retaining means within said casing with said fingers projecting inwardly towards the center of the casing for engaging the outermost convolution of the coiled tape.

AUSTIN L. STOWELL.